US008098903B2

(12) United States Patent
Fukushi (10) Patent No.: US 8,098,903 B2
(45) Date of Patent: Jan. 17, 2012

(54) APPARATUS FOR ADJUSTING FOCUS AND EXPOSURE BASED ON A FACE IMAGE AND METHOD OF CONTROLLING SAME

(75) Inventor: Kazuhito Fukushi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1191 days.

(21) Appl. No.: 11/889,422

(22) Filed: Aug. 13, 2007

(65) Prior Publication Data
US 2008/0075337 A1 Mar. 27, 2008

(30) Foreign Application Priority Data
Sep. 22, 2006 (JP) .................................. 2006-256558

(51) Int. Cl.
*G06K 9/00* (2006.01)
(52) U.S. Cl. ......................... 382/118; 382/115; 382/103
(58) Field of Classification Search .................. 382/103, 382/115, 118, 100; 351/204
See application file for complete search history.

(56) References Cited

U.S. PATENT DOCUMENTS

| 2003/0142209 A1* | 7/2003 | Yamazaki et al. ............ 348/143 |
| 2004/0017930 A1* | 1/2004 | Kim et al. ..................... 382/103 |
| 2007/0183663 A1* | 8/2007 | Wang et al. ................... 382/173 |

FOREIGN PATENT DOCUMENTS

| JP | 6-217187 | 8/1994 |
| JP | 2001-215403 A | 8/2001 |
| JP | 2006-128793 A | 5/2006 |

\* cited by examiner

*Primary Examiner* — Brian Q Le
*Assistant Examiner* — Edward Park
(74) *Attorney, Agent, or Firm* — Birch, Stewart, Kolasch & Birch, LLP (57) ABSTRACT

Disclosed is a technique that eliminates problems that result when a face image fails to be detected in a case where the image of a subject obtained continuously is subjected to face-image detection processing. A face-image portion is detected in the image of a subject. If an evaluation value for evaluating the degree of face likeliness of the face-image portion is equal to or greater than a threshold value, the result of face detection is updated. A timer is set. If the timer has not timed out in a case where the evaluation value of a face image in the next frame of the image of the subject is less than the threshold value, the face-image portion of the preceding frame is regarded as the face-image portion of the next frame and processing regarding this face-image portion is executed. Thus, even if a face-image portion is no longer detected, processing regarding a face-image portion can be executed using the face-image portion of the preceding frame.

2 Claims, 6 Drawing Sheets

APPARATUS FOR ADJUSTING FOCUS AND EXPOSURE BASED ON A FACE IMAGE AND METHOD OF CONTROLLING SAME

BACKGROUND OF THE INVENTION

1. Field of the Invention

This invention relates to a face detecting apparatus and to a method of controlling this apparatus.

2. Description of the Related Art

When the image of a subject is sensed continuously as in the case of a moving picture or so-called "through-image", there are instances where, in order to bring a portion of the image of the main subject such as the face of a person into focus, the portion of the image that is the image of the face is detected. Such prior art includes a technique for detecting the face-image portion and bringing the eyes into focus (Japanese Patent Application Laid-Open No. 2001-215403), a technique for controlling a zoom position in conformity with the size of the face (Japanese Patent Application Laid-Open No. 6-217187) and a technique for detecting a plurality of face-image portions and consolidating face-image portions in accordance with an operation performed by a user (Japanese Patent Application Laid-Open No. 2006-128793).

Further, there are also instances where a face-image portion cannot be detected if the face of the subject is oriented sideways. If the face-image portion cannot be detected, a problem that can result is that processing that utilizes the face-image portion (processing for bringing the face-image portion into focus) will not be executed stably. For this reason, there is a technique for interpolating face information from preceding and succeeding images if a face can no longer be detected during continuous shooting (Japanese Patent Application Laid-Open No. 2006-128793).

However, processing for interpolating face information is comparatively complicated.

Furthermore, there are instances where the face-image portion of the same person cannot be kept track of if the subject moves.

SUMMARY OF THE INVENTION

Accordingly, an object of the present invention is to solve the foregoing problems that result when a face-image portion can no longer be detected.

Another object of the present invention is to so arrange it that it is possible to determine whether a face-image portion detected in a case where a subject has moved is that of the same person.

According to a first aspect of the present invention, the foregoing objects are attained by providing a face image detecting apparatus comprising: a face-likeliness determination device (means) for determining whether a value of face likeliness of a detected image portion is equal to or greater than a prescribed threshold value, the detected image portion being within an image represented by applied image data; a position storage device (means) for storing a position regarded as a face-image portion in the image; an updating device (means) for updating a position, which has been stored in the position storage device, to the position of the detected image portion upon deciding that the detected image portion is a face-image portion in response to a determination by the face-likeliness determination device that the value of face likeliness of the face-image portion is equal to or greater than the threshold value; a repetition control device (means) for repeating determination processing by the face-likeliness determination device and update processing by the updating device with regard to a continuously applied image; a deciding device (means) for starting timekeeping by a timer for every incidence of update processing in the updating device, and deciding that while the timekeeping is in progress, a face-image portion is present at the position that has been stored in the position storage device; and a position resetting device (means) for resetting the position that has been stored in the position storage device, in response to a determination by the face-likeliness determination device that the value of face likeliness of the detected image portion is less than the threshold value and, moreover, end of timekeeping by the timer.

The first aspect of the present invention also provides a control method suited to the above-described face image detected apparatus. Specifically, the first aspect of the present invention provides a method of controlling a face image detecting apparatus, comprising the steps of: determining whether a value of face likeliness of a detected image portion is equal to or greater than a prescribed threshold value, the detected image portion being within an image represented by applied image data; storing in memory a position regarded as a face-image portion in the image; updating a position, which has been stored in the memory, to the position of the detected image portion upon deciding that the detected image portion is a face-image portion in response to a determination that the value of face likeliness of the face-image portion is equal to or greater than the threshold value; repeating the face-likeliness determination processing and the update processing with regard to a continuously applied image; starting timekeeping by a timer for every incidence of update processing, and deciding that while the timekeeping is in progress, a face-image portion is present at the position that has been stored in the memory; and resetting the position that has been stored in the memory, in response to a determination that the value of face likeliness of the detected image portion is less than the threshold value and, moreover, end of timekeeping by the timer.

In accordance with the first aspect of the present invention, it is determined whether the value of face likeliness of a detected image portion within an image is equal to or greater than a threshold value. If the value is equal to or greater than the threshold value, then it is decided that this detected image portion is a face-image portion and the position of the detected image portion is stored. This determination processing involving the threshold value is repeated for every applied image, and storage of the position of the detected image portion is updated whenever it is detected that the value of face likeliness is equal to or greater than the threshold value in continuously applied images. Timekeeping by a timer starts whenever updating is performed. The fact that timekeeping by the timer is in progress is construed as meaning that a face-image portion exists, and this is dealt with as indicating existence of the face-image portion at the stored position of the detected image portion even if the value of face likeliness of a detected image portion in the next image, for example, is less than the threshold value. If the value of face likeliness is less than the threshold value and, moreover, timekeeping by the timer has ended, then the stored position of the detected image portion is reset. If images are applied continuously and a face-image portion is no longer detected in a certain frame of an image, a face-image portion is still regarded as being present at the previously detected position so long as timekeeping by the timer is still in progress. This makes it possible to prevent problems that result from an inability to detect a face-image portion.

The apparatus may further comprise a peak-value storage device (means) for storing a peak value of the value of face likeliness while updating the peak value; and a timer control device (means) for controlling the timer in such a manner that the closer the value of face likeliness when it was updated by the updating device is to the peak value that has been stored in the peak-value storage device, the longer the timekeeping time.

The apparatus may further comprise an image sensing device (means) for sensing the image of a subject continuously and outputting image data representing the image of the subject. In this case, the face likeliness determination device would be supplied with image data that has been output from the image sensing device. The apparatus may further comprise a focusing/luminance-adjusting device (means) for focusing the face-image portion decided by the deciding device or making the brightness of the face-image portion, which is decided by the deciding device, a prescribed brightness.

According to a second aspect of the present invention, the foregoing objects are attained by providing a face image detecting apparatus for detecting a face-image portion contained in each image of a plurality of frames of images represented by continuously applied image data, comprising: a detecting device (means) for detecting a value of face likeliness and position of a face-image portion contained in an image represented by applied image data; a displacement-amount measuring device (means) for measuring amount of displacement between the position of the face-image portion detected by the detecting device and position of a face-image portion detected by the detecting device in a preceding frame of an image; a displacement-amount determination device (means) for determining whether the amount of displacement measured by the displacement-amount measuring device is less than a threshold value; a face-likeliness determination device (means) for determining whether the value of face likeliness detected by the detecting device is equal to or greater than a prescribed threshold value; and a deciding device (means) for deciding that a person having a face-image portion at the position detected by the detecting device and a person having a face-image portion at the position detected in the preceding frame of the image are the same in response to a determination by the displacement-amount determination device that the amount of displacement is less than the threshold value and, moreover, a determination by the face-likeliness determination device that the value of face likeliness is equal to or greater than the threshold value.

The second aspect of the present invention also provides a control method suited to the above-described face image detected apparatus. Specifically, the second aspect of the present invention provides a method of controlling a face image detecting apparatus for detecting a face-image portion contained in each image of a plurality of frames of images represented by continuously applied image data, comprising the steps of: detecting a value of face likeliness and position of a face-image portion contained in an image represented by applied image data; measuring amount of displacement between the detected position of the face-image portion and position of a face-image portion detected in a preceding frame of an image; determining whether the measured amount of displacement is less than a threshold value; determining whether the detected value of face likeliness is equal to or greater than a prescribed threshold value; and deciding that a person having a face-image portion at the detected position and a person having a face-image portion at the position detected in the preceding frame of the image are the same in response to a determination that the amount of displacement is less than the threshold value and, moreover, a determination that the value of face likeliness is equal to or greater than the threshold value.

In accordance with the second aspect of the present invention, the amount of displacement between the position of a face-image portion in the present frame of an image and the position of a face-image portion in the preceding frame of an image is measured. If the measured amount of displacement is less than a threshold value, the person represented by the face-image portion in the present frame of the image and the person represented by the face-image portion in the preceding frame of the image are considered to be the same. Therefore, if the value of face likeliness of the face-image portion in the present frame of the image is equal to or greater than a threshold value, a decision is rendered that this represents the face image of the same person. It can be determined whether the person having the face-image portion contained in the preceding frame of the image and the person having face-image portion contained in the present frame of the image are identical. If they are not identical, processing (e.g., focus processing) using this face-image portion can be halted. The user can be notified of the fact that the persons are not identical.

The apparatus may further comprise an image sensing device (means) for sensing the image of a subject continuously and outputting image data representing the image of the subject. In this case, the detecting device would be supplied with image data that has been output from the image sensing device. The apparatus may further comprise a focusing/luminance-adjusting device (means) for focusing the face-image portion at the position detected by the detecting device (means) or making the brightness of the face-image portion, which is at the position detected by the detecting device, a prescribed brightness.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail with reference to the drawings.

Figure 1:
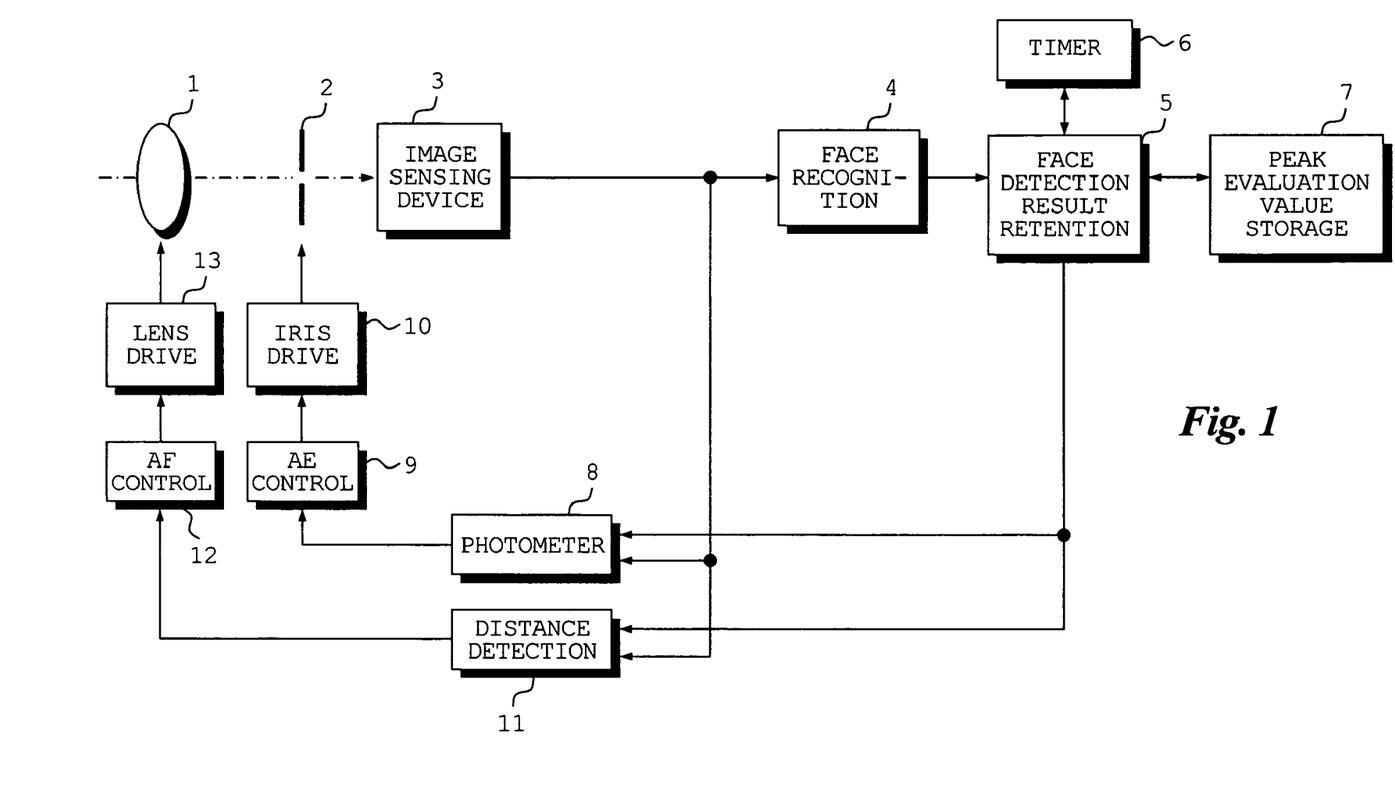
FIG. 1 is a block diagram illustrating part of the electrical structure of a digital camera according to a first embodiment of the present invention.

FIG. 1 is a block diagram illustrating part of the electrical structure of a digital camera according to a first embodiment of the present invention.

The digital camera according to this embodiment senses the image of a subject continuously and is capable of detecting a face-image portion in each frame of the image of the subject. Processing using the detected face-image portion can be executed. For example, AF (automatic focusing) control can be carried out so as to bring the detected face-image portion into focus, and AE (automatic exposure adjustment) control can be performed in such a manner that the detected face-image portion takes on a suitable brightness. In cases where a face-image portion is detected, there are instances where detection cannot be achieved if the face is oriented sideways. Since the face-image portion cannot be detected in such cases even though the face-image portion is present in the image, there are instances where processing using the face-image portion cannot be executed, and processing using the face-image portion may become unstable. The digital camera according to this embodiment is so adapted that even if a face-image portion can no longer be detected, the face image is regarded as being the face image that exists in a previously found face-image portion when certain conditions are satisfied. This eliminates unstable processing that can result from failure to find a face-image portion.

Light representing the image of a subject is condensed by an imaging lens 1 and impinges upon an image sensing device through an iris 2. Image data representing the image of the subject is output from the image sensing device 3 and is input to a face recognition unit 4, photometer unit 8 and distance detecting unit 11.

The face recognition unit 4 calculates the position (x,y) of a face-image portion (namely the center coordinates x, y of a rectangular face-image portion) from within the image of the subject represented by the entered image data, and an evaluation value (a value of face likeliness, namely the degree to which the image is face-like) k of the face-image portion. The position (x,y) of the face-image portion and the evaluation value k of the face-image portion are applied to a unit 5 for retaining the result of face detection. If the evaluation value k applied thereto is equal to or greater than a prescribed threshold value, the unit 5 construes that a face image truly exists in the portion of the image detected as being a face-image portion. Accordingly, the unit 5 stores the position (x,y) and the evaluation value k of the face-image portion. If the evaluation value k applied thereto is less than the prescribed threshold value, then the unit 5 construes that the portion of the image detected as being a face-image portion in the face recognition unit 4 should not be appraised as a face-image portion and therefore does not store the position (x,y) of the face-image portion and the evaluation value k applied thereto.

Data indicating the position (x,y) of the face-image portion stored in the unit 5 and the size of the face-image portion is applied to the photometer unit 8 and distance detecting unit 11. Data indicating the brightness of the face-image portion is detected by the photometer unit 8. The detected data is applied to an AE control circuit 9. Under the control of the AE control circuit 9, the iris 2 is driven by an iris driving circuit 10 in such a manner that the face-image portion will take on a prescribed brightness. The distance to the face of the subject is measured by the distance detecting unit 11. Data indicating the distance to the face is supplied from the distance detecting unit 11 to an AF control circuit 12. Under the control of the AF control circuit 12, the position of the imaging lens 1 is driven by a lens driving circuit 13 so as to bring the face-image portion into focus.

If the result of face detection in the unit 5 for retaining the result of face detection is updated, a timer 6 is set and starts measuring time whenever updating is performed. If the result obtained by subjecting the next frame of the image of the subject to processing for detecting a face-image portion is that a face-image portion has not been detected (i.e., if the evaluation value k of the face-image portion is less than the threshold value), then, in a case where the timer 6 is still measuring time, this means that the time that has elapsed since a face-image portion was detected previously is short. Accordingly, it is construed that the position of the face-image portion has not changed. AF control and AE control is therefore executed in such a manner that the face-image portion detected previously will be brought into focus and take on the prescribed brightness. When timekeeping by the timer 6 ends, this means that a long period of time has elapsed since a face-image portion was detected previously. Hence it is construed that the position of the face-image portion has changed. Accordingly, AF control and AE control utilizing the previously detected face-image portion is not carried out.

The unit 5 for retaining the result of face detection also stores a peak value kp of the evaluation value k in a peak-value storage unit 7 while updating the peak value. Since a frontal face image has a high detection accuracy while a sideways face image has a low detection accuracy, the evaluation value k of a frontal face image is greater than the evaluation value k of a sideways face image. The closer a detected face image is to a frontal face image, the larger the peak value kp. If the evaluation value k of a detected face-image portion is close to the peak value kp, then the face-image portion is considered to be one that is nearly frontal. Accordingly, the accuracy of the degree of face likeliness is considered to be high. The timer 6 is therefore controlled by the unit 5 in such a manner that the closer the evaluation value k is to the peak value kp, the longer the timekeeping period of the timer 6 becomes.

Figure 2:
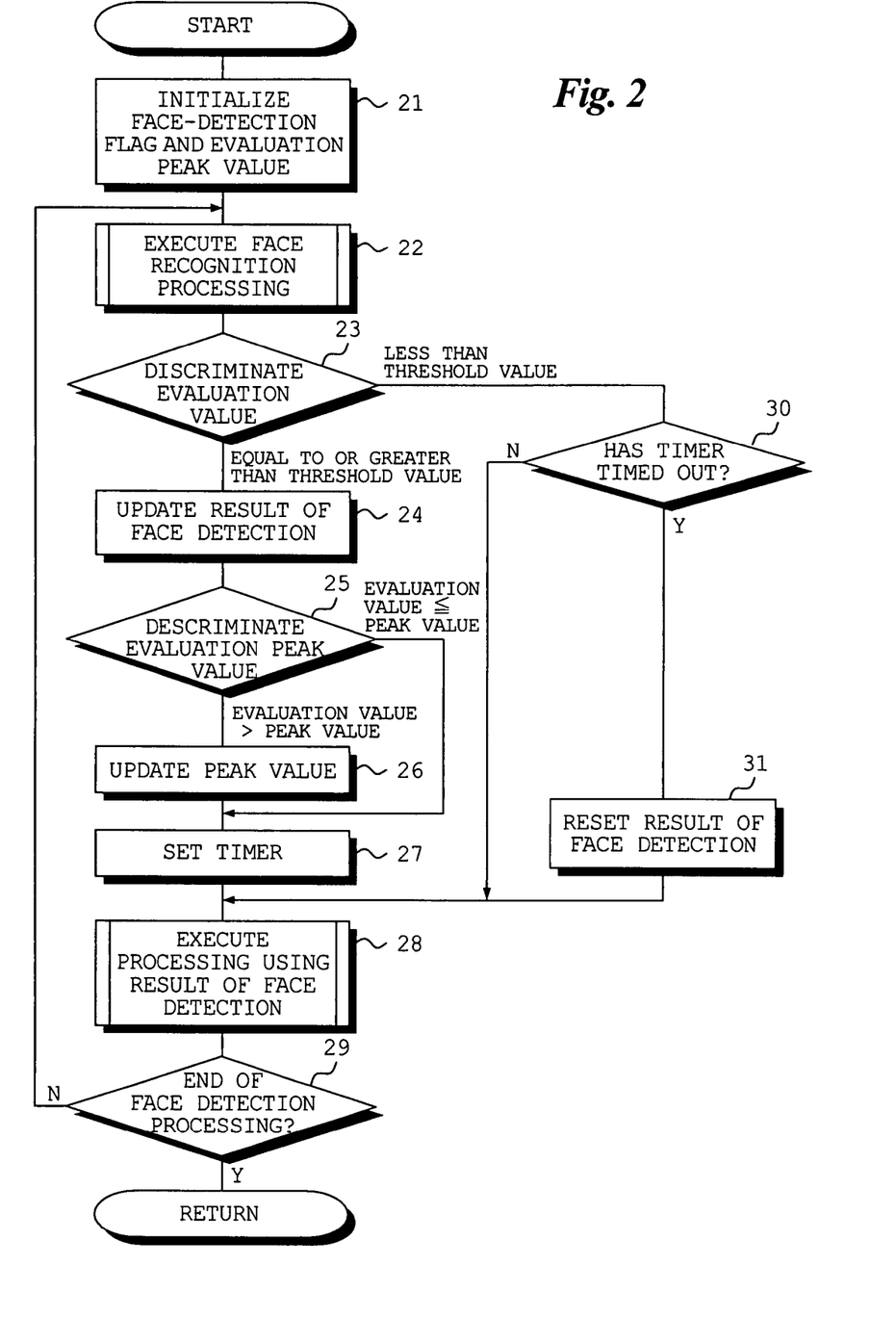
FIG. 2 is a flowchart illustrating processing executed by the digital camera according to the first embodiment.

FIG. 2 is a flowchart illustrating processing relating to face detection by the digital camera according to this embodiment.

First, a face-detection flag and the evaluation peak value kp are initialized (step 21).

Next, the image of the subject is sensed, a rectangular detected image portion is scanned from within the present frame of the image of the subject obtained and face recognition processing for detecting a face-image portion is executed (step 22). The center coordinates (x,y) of the face-image portion (the position regarded to be that of the face-image portion) and the evaluation value k thereof are obtained by face recognition processing from within the present frame of the image of the subject obtained. If a plurality of face-image portions have been detected in one frame of the image of the subject, then the center coordinates (x,y) and evaluation value k of the face-image portion having the largest evaluation value k or a face-image portion designated by the user would be obtained.

Figure 3:
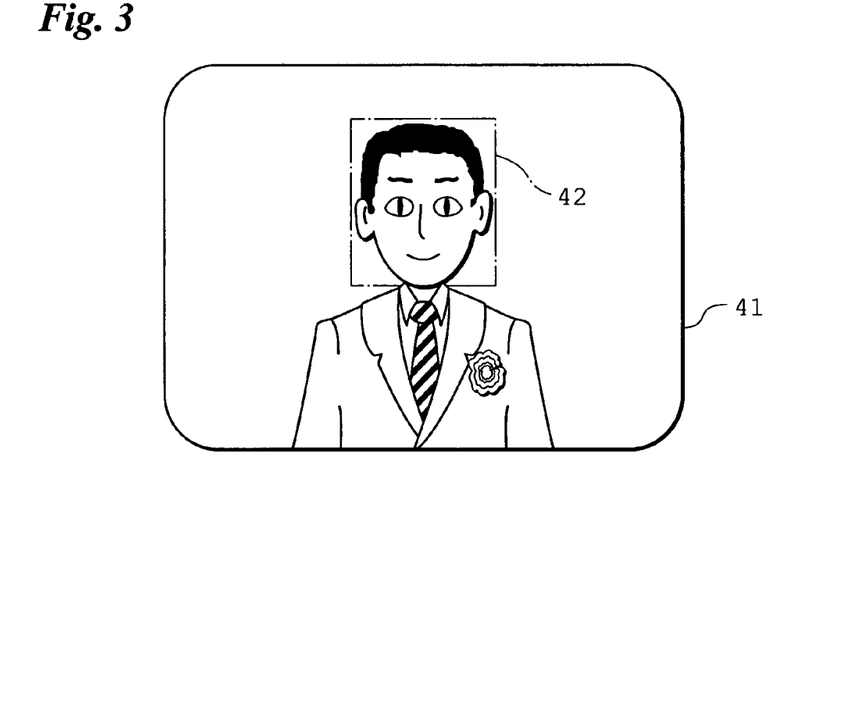
FIG. 3 illustrates an example of the image of a subject.

If the evaluation value k obtained is equal to or greater than a threshold value (step 23), then it is construed that a face image is actually contained in the portion detected as being a face-image portion. Accordingly, the center coordinates (x,y) that have been stored in the unit 5 are updated and the face-detection flag is turned ON (step 24). For example, assume that by sensing the image of a subject, a subject image 41 shown in FIG. 3 is obtained and a face-image portion 42 is detected by face recognition processing. In this case, the center coordinates (x,y) of the face-image portion 42 are stored in the unit 5 (the coordinates in the unit 5 are updated).

Next, the evaluation value k obtained and the evaluation peak value kp are compared (step 25). If the evaluation value k obtained is larger than the peak value kp, then the peak value kp is updated to the evaluation value k obtained (step 26). If the evaluation value k obtained is equal to or less than the peak value kp, then the processing of step 26 is skipped. A timekeeping period of the timer 6 that is based upon the relationship between the evaluation value k obtained and the peak value kp is set (step 27). For example, if the evaluation value k is the same as the peak value kp, the timekeeping period will be one second. If the evaluation value k is 70%, 35% and 20% of the peak value kp, then the timekeeping period will be 0.70, 0.35 and 0.20 second, respectively.

Processing such as AF processing and AE processing is executed with regard to the detected face-image portion (step 5 28). If face detection processing has not ended ("NO" at step 29), processing from step 22 onward is repeated.

If the image of a subject is sensed again upon elapse of a prescribed period of time, the next frame of the image of the subject is obtained. The image of the subject obtained is subjected to face recognition processing (step 22). If the evaluation value k of the detected face-image portion is less than the threshold value, it is determined whether the timer 6 has timed out (step 30). If the timer 6 is in the process of timekeeping ("NO" at step 30), this means that not much time has passed since updating of the result of face detection. Accordingly, processing such as AF processing and AE processing is executed utilizing the face-image portion detected previously (step 28). If the timer 6 has timed out ("YES" at step 30), this means that a comparatively long time has passed since updating of the result of face detection. The result of face detection, therefore, is reset (step 31). Specifically, the center coordinates (x,y) of the previously detected face-image portion that have been stored in the unit 5 are erased and the face-detection flag is turned OFF. Since the result of face detection has been reset, processing (AF processing and AE processing, etc.) using the result of face detection is processing that utilizes the overall image of the subject, for example, and not processing that utilizes a face-image portion (step 28).

Figure 4:
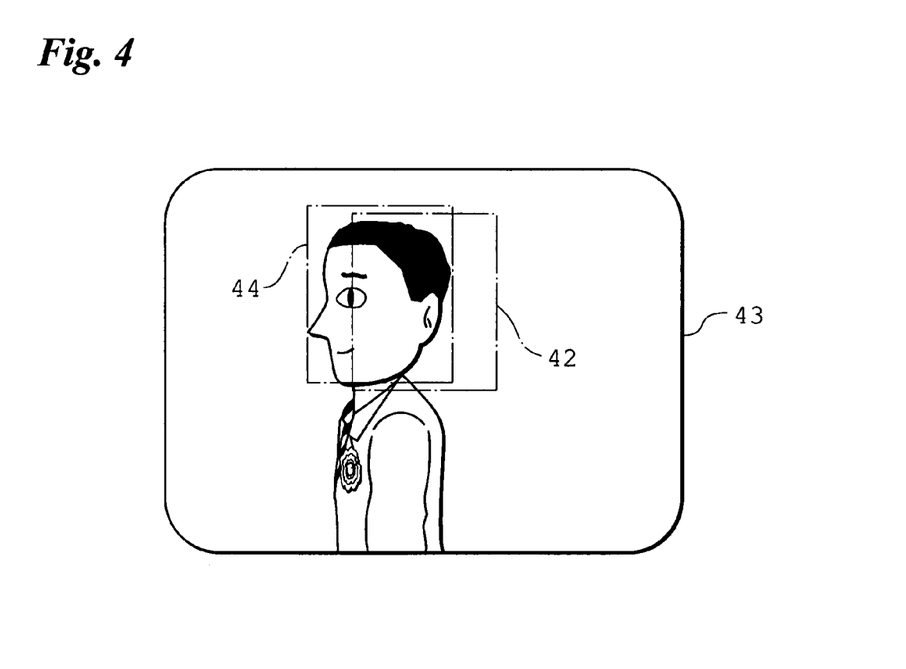
FIG. 4 illustrates an example of the image of a subject.

By way of example, assume that the subject image 41 containing the face-image portion 42 for which the evaluation value k is equal to or greater than the threshold value is obtained, as illustrated in FIG. 3, and that a subject image 43 shown in FIG. 4 is obtained subsequently. Since the face-image portion 42 contained in the subject image 43 is a sideways face image, the evaluation value k thereof is less than the threshold value. If timekeeping by the timer 6 has not ended during the time from updating of the evaluation value k of face-image portion 42 to processing for discriminating the evaluation value k of a face-image portion 44, then the image portion at the position of the face-image portion 42 is subjected to processing such as AF processing and AE processing with regard to subject image 43 as well in a manner similar to that of subject image 41. If timekeeping by the timer 6 has ended during the time from updating of the evaluation value k of face-image portion 42 to processing for discriminating the evaluation value k of a face-image portion 44, then it is construed that a face-image portion does not exist in the subject image 43 shown in FIG. 4 and the result of face detection is reset in the manner described above.

Figure 5:
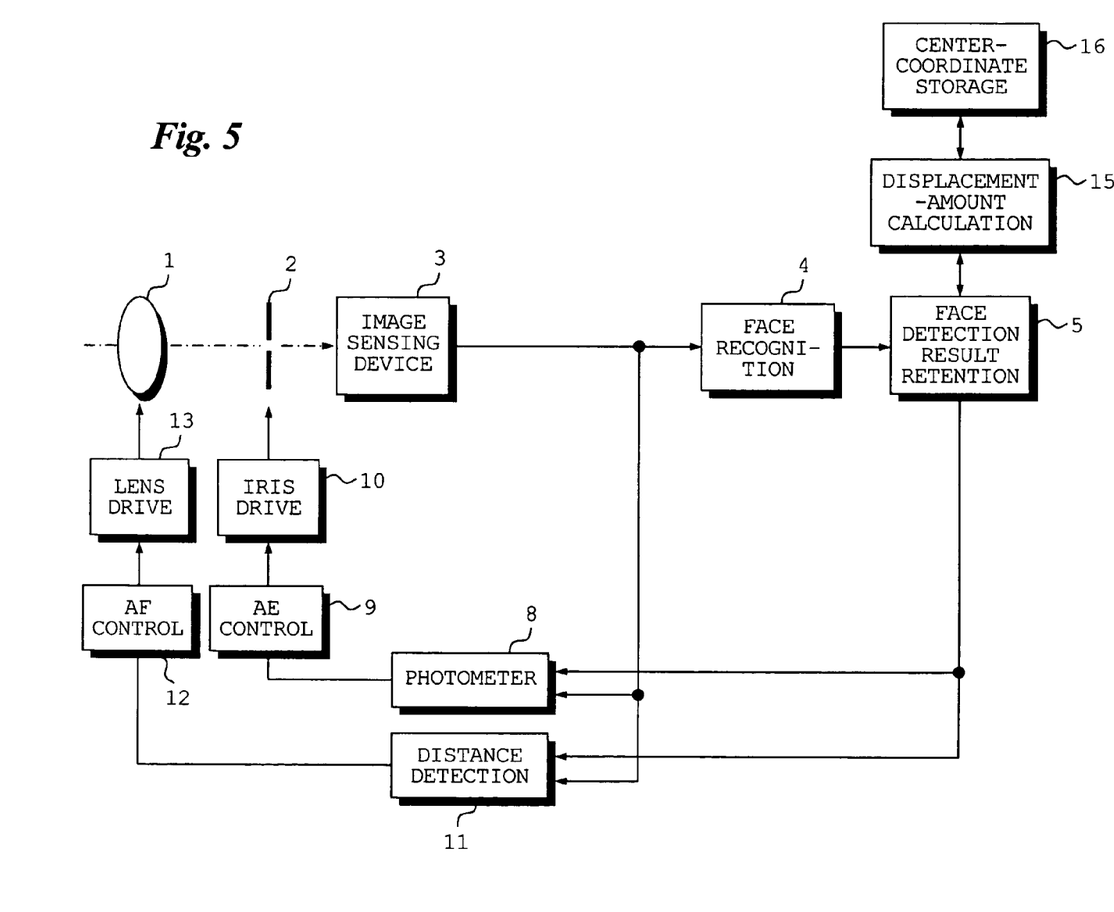
FIG. 5 is a block diagram illustrating part of the electrical structure of a digital camera according to a second embodiment of the present invention.
Figure 6:
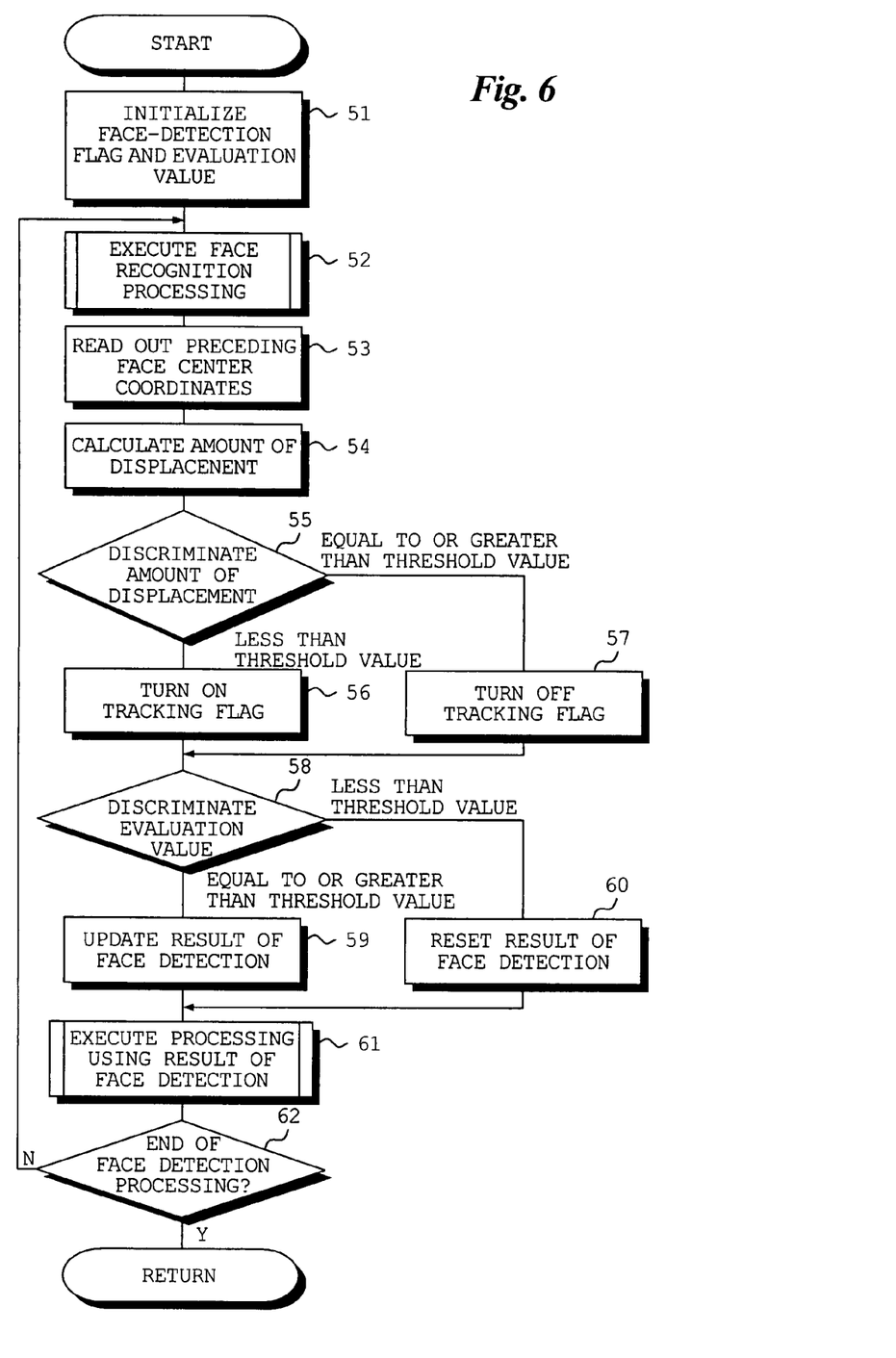
FIG. 6 is a flowchart illustrating processing executed by the digital camera according to the second embodiment.
Figure 7:
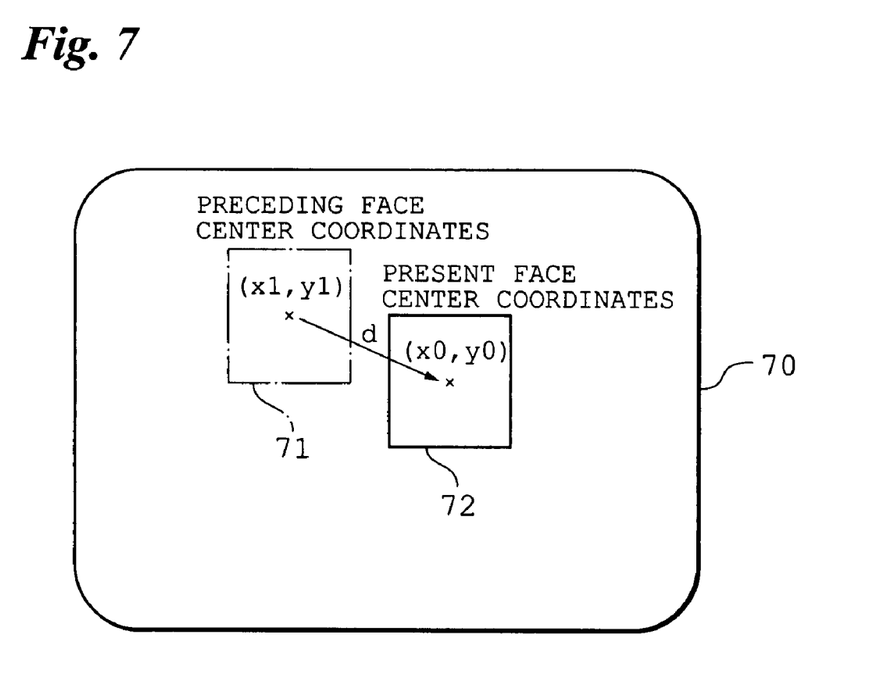
FIG. 7 illustrates an example of the image of a subject.

FIGS. 5 to 7 illustrate a second embodiment of the present invention.

FIG. 5 is a block diagram illustrating part of the electrical structure of a digital camera according to this embodiment. Circuits in FIG. 5 identical with those shown in FIG. 1 are designated by like reference characters and need not be described again.

The digital camera according to this embodiment measures the amount of displacement between the center coordinates of the face-image portion of the preceding frame of the image of the subject and the center coordinates of the face-image portion of the present frame of the image of the subject, regards the persons having the two face-image portions as being the same person if the amount of displacement is less than a threshold value, and regards the persons having the two face-image portions as being different persons if the amount of displacement is equal to or greater than the threshold value. Processing such as AF processing and AE processing can be continued with regard to the face-image portion only if it is determined that the person is the same.

The center coordinates of the face-image portion are stored in the unit 5 that retains the result of face detection. These center coordinates that have been stored in the unit 5 are stored in a center-coordinate storage unit 16, which is for storing the center coordinates of the preceding face, when the result of face detection regarding the next frame of the image of the subject is stored. Data representing the center coordinates of the face-image portion detected in the preceding frame of the image of the subject is stored in the center-coordinate storage unit 16, and data representing the center coordinates of the face-image portion detected in the present frame of the image of the subject is stored in the unit 5 that retains the result of face detection. A displacement-amount calculation unit 15 compares the center coordinates of the face-image portion detected in the preceding frame of the image of the subject and the center coordinates of the face-image portion detected in the present frame of the image of the subject and calculates the amount of displacement (amount of movement) between the preceding frame of the face-image portion and the present frame of the face-image portion. Whether the person is the same is determined, in the manner described above, depending upon whether the calculated amount of displacement is equal to or greater than the threshold value. In this case also if a plurality of face-image portions have been detected in one frame of the image of the subject, the one having the largest evaluation value is utilized.

FIG. 6 is a flowchart illustrating processing relating to face detection by the digital camera according to this embodiment. FIG. 7 illustrates a preceding face-image portion represented on the present image of a subject.

First, a face-detection flag and evaluation value are initialized (step 51). If the image of a subject is sensed and the image of the subject is obtained, a face-image portion in this subject image is detected (step 52). The center coordinates (x0,y0) of a present face-image portion 72 are obtained by processing for detecting the face-image portion. Further, center coordinates (x1,y1) of a preceding face-image portion 71 are read out of the center-coordinate storage unit 16 (step 53). The distance (amount of displacement) d between the center coordinates (x0,y0) of a present face-image portion 72 and the center coordinates (x1,y1) of a preceding face-image portion 71 is calculated (step 54).

If the calculated displacement amount d is less than a threshold value (step 55), the person having the preceding face-image portion 71 and the person having the present face-image portion 72 are regarded as being the same and a tracking flag is turned ON (step 56). If the calculated displacement amount d is equal to or greater than the threshold value (step 55), then the person having the preceding face-image portion 71 and the person having the present face-image portion 72 are regarded as being different and the tracking flag is turned OFF (step 57).

Processing for discriminating the evaluation value of the present face-image portion 72 is executed (step 58). If the evaluation value k is equal to or greater than the threshold value, then the result of face detection is updated by the ON state of the face-detection flag, updating of the center coordinates of the face, etc. (step 59). If the evaluation value k is less than the threshold value, then the face-detection flag is turned OFF and the result of face detection is reset (step 60).

Next, processing such as AF processing and AE processing is executed using the result of face detection (step 61). If the face tracking flag and the face-detection flag are both ON, then it is considered that the person of the present frame of the face-image portion 72 is the same as that of the preceding frame of the face-image portion 71 and that this image actually represents a face image. Accordingly, AF processing and AE processing is executed with regard to the face-image portion 72. If the face-detection flag is ON but the face tracking flag is OFF, then it is considered that the present frame of the face-image portion 72 actually represents a face image. However, since the person having the face-image portion 71 of the preceding frame is considered to be a different person, AF processing and AE processing regarding the face-image portion 72 is halted. Of course, it may be so arranged that AF processing and AE processing regarding the face-image portion 72 is executed upon notifying the user that the person has changed. In a case where the face-detection flag is OFF, AF processing and AE processing of the entire subject image 70 is executed and not AF processing and AE processing of the face-image portion. If face detection processing has not ended ("NO" at step 62), processing is executed again from step 52 onward.

As many apparently widely different embodiments of the present invention can be made without departing from the spirit and scope thereof, it is to be understood that the invention is not limited to the specific embodiments thereof except as defined in the appended claims.

What is claimed is:

1. A face image detecting apparatus for detecting a face-image portion contained in each image of a plurality of frames of images represented by continuously applied image data, comprising:
    an image sensing device for sensing the image of a subject continuously and outputting image data representing the image of the subject;
    a detecting device for detecting a value of face likeliness and position of a face-image portion contained in the image represented by the image data that has been output from said image sensing device;
    a displacement-amount measuring device for measuring amount of displacement between the position of the face-image portion detected by said detecting device and position of a face-image portion detected by the detecting device in a preceding frame of an image;
    a displacement-amount determination device for determining whether the amount of displacement measured by said displacement-amount measuring device is less than a threshold value;
    a face-likeliness determination device for determining whether the value of face likeliness detected by said detecting device is equal to or greater than a prescribed threshold value;
    a deciding device for deciding that a person having a face-image portion at the position detected by said detecting device and a person having a face-image portion at the position detected in the preceding frame of the image are the same in response to a determination by said displacement-amount determination device that the amount of displacement is less than the threshold value and, moreover, a determination by said face-likeliness determination device that the value of face likeliness is equal to or greater than the threshold value; and
    a focusing/luminance-adjusting device, wherein
        (i) in response to a decision by said deciding device that the persons are the same, the focusing/luminance-adjusting device focuses the face-image portion at the position detected by said detecting device or makes the brightness of the face-image portion, which is at the position detected by the detecting device, a prescribed brightness,
        (ii) in response to determinations that the amount of displacement is not less than the threshold value, and that the value of face likeliness is equal to or greater than the prescribed threshold value, the focusing/luminance-adjusting device focuses the face-image portion at the position detected by said deciding device or makes the brightness of the face-image portion, which is at the position detected by the detecting device, a prescribed brightness upon notifying that the person has changed, and
        (iii) in response to a determination that the value of face likeliness is not equal to or greater than the prescribed threshold value, the focusing/luminance-adjusting device focuses the entire subject image or makes the brightness of the entire subject image a prescribed brightness.

2. A method of controlling a face image detecting apparatus for detecting a face-image portion contained in each image of a plurality of frames of images represented by continuously applied image data, comprising the steps of:
    sensing, with an image sensing device, the image of a subject continuously;
    outputting, from the image sensing device, image data representing the image of the subject;
    detecting, with a detecting device, a value of face likeliness and position of a face-image portion contained in the image represented by the image data that has been output from said image sensing device;
    measuring, with a displacement-amount determination device, an amount of displacement between the detected position of the face-image portion and position of a face-image portion detected in a preceding frame of an image;
    determining, with a face-likeness determination device, whether the measured amount of displacement is less than a threshold value;
    determining, with a face-likeliness determination device, whether the detected value of face likeliness is equal to or greater than a prescribed threshold value; and
    deciding, with a deciding device, that a person having a face-image portion at the detected position and a person having a face-image portion at the position detected in the preceding frame of the image are the same in response to a determination that the amount of displacement is less than the threshold value and, moreover, a determination that the value of face likeliness is equal to or greater than the threshold value; and
    operating a focusing/luminance-adjusting device, wherein
        (i) in response to a decision by said deciding device that the persons are the same, the focusing/luminance-adjusting device focuses the face-image portion at the position detected by said detecting device or makes the brightness of the face-image portion, which is at the position detected by the detecting device, a prescribed brightness,
        (ii) in response to determinations that the amount of displacement is not less than the threshold value, and that the value of face likeliness is equal to or greater than the prescribed threshold value, the focusing/luminance-adjusting device focuses the face-image portion at the position detected by said deciding device or makes the brightness of the face-image portion, which is at the position detected by the detecting device, a prescribed brightness upon notifying that the person has changed, and (iii) in response to a determination that the value of face likeliness is not equal to or greater than the prescribed threshold value, the focusing/luminance-adjusting device focuses the entire subject image or makes the brightness of the entire subject image a prescribed brightness.

* * * * *